US005372707A

United States Patent [19]

Buchanan et al.

[11] Patent Number: 5,372,707

[45] Date of Patent: Dec. 13, 1994

[54] UNDERFLOW CYCLONES AND FCC PROCESS

[75] Inventors: J. Scott Buchanan, Mercerville, N.J.; Michael F. Raterman, Doylestown, Pa.; Christopher G. Smalley, Hamilton, N.J.

[73] Assignee: Mobil Oil Corporation, Fairfax, Va.

[21] Appl. No.: 47,911

[22] Filed: May 28, 1993

[51] Int. Cl.[5] ....................... B01D 21/26; B01D 45/12; B04C 1/00

[52] U.S. Cl. .................................... 208/161; 208/113; 55/459.1; 210/512.1; 210/787; 210/788

[58] Field of Search .................... 55/459.1; 210/512.1, 210/787, 788; 208/113, 161

[56] References Cited

U.S. PATENT DOCUMENTS

| | | | |
|---|---|---|---|
| 2,672,215 | 3/1954 | Schmid | 55/459.1 |
| 3,970,437 | 7/1976 | Van Diepenbroek et al. | 55/459.1 |
| 4,151,044 | 4/1979 | Choi | 202/121 |
| 4,956,091 | 9/1990 | Van Den Akker | 55/459.1 |
| 5,002,671 | 3/1991 | de Villiers et al. | 55/459.1 |
| 5,055,177 | 10/1991 | Haddad et al. | 208/161 |
| 5,190,650 | 3/1993 | Tammera et al. | 208/161 |

OTHER PUBLICATIONS

"Energy recovery pays off at three Shell refineries", *Technology*, by J. G. Wilson, Shell Oil Co., New York, N.Y. *Oil and Gas Journal*, Apr. 18, 1966.

*Primary Examiner*—Paul Lieberman
*Assistant Examiner*—Patricia Hailey
*Attorney, Agent, or Firm*—Alexander J. McKillop; Malcolm D. Keen; Richard D. Stone

[57] ABSTRACT

A "leaking" cyclone and process for fluidized catalytic cracking of heavy oils is disclosed. Gas and entrained solids are added tangentially to swirl around a vapor outlet tube in a cylindrical tube cyclone body. A concentrated stream of solids and some gas is withdrawn from the device through openings in the cylindrical sidewall remote from the inlet. Tangential withdrawal via an offset slit in the sidewall, or withdrawal through holes in the sidewall, replaces or reduces conventional underflow of solids from an end of the cyclone body. Fine (0–5 micron) particles removal is enhanced by withdrawing solids as soon as solids reach the cylindrical sidewall. The device may be used as a third stage separator on an FCC regenerator.

19 Claims, 4 Drawing Sheets

UNDERFLOW CYCLONES AND FCC PROCESS

BACKGROUND OF THE INVENTION

1. Field of the Invention

The field of the invention is fluidized catalytic cracking of heavy hydrocarbon feeds and cyclones for separating fine solids from vapor streams.

2. Description of Related Art

Catalytic cracking is the backbone of many refineries. It converts heavy feeds into lighter products by catalytically cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

There are two main variants of the catalytic cracking process: moving bed and the far more popular and efficient fluidized bed process.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.–600° C., usually 460° C.–560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.–900° C., usually 600° C.–750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. Modern fluid catalytic cracking (FCC) units use zeolite catalysts. Zeolite-containing catalysts work best when coke on the catalyst after regeneration is less than 0.1 wt %, and preferably less than 0.05 wt %.

To regenerate FCC catalyst to this low residual carbon level and to burn CO completely to CO2 within the regenerator (to conserve heat and reduce air pollution) many FCC operators add a CO combustion promoter. U.S. Pat. Nos. 4,072,600 and 4,093,535, incorporated by reference, teach use of combustion-promoting metals such as Pt, Pd, Ir, Rh, Os, Ru and Re in cracking catalysts in concentrations of 0.01 to 50 ppm, based on total catalyst inventory.

Most FCC's units are all riser cracking units. This is more selective than dense bed cracking. Refiners maximize riser cracking benefits by going to shorter residence times, and higher temperatures. The higher temperatures cause some thermal cracking, which if allowed to continue would eventually convert all the feed to coke and dry gas. Shorter reactor residence times in theory would reduce thermal cracking, but the higher temperatures associated with modern units created the conditions needed to crack thermally the feed. We believed that refiners, in maximizing catalytic conversion of feed and minimizing thermal cracking of feed, resorted to conditions which achieved the desired results in the reactor, but caused other problems which could lead to unplanned shutdowns.

Emergency shutdowns are much like wheels up landings of airplanes, there is no loss of life but the economic losses are substantial. Modern FCC units must run at high throughput, and run for years between shutdowns, to be profitable. Much of the output of the FCC is needed in downstream processing units, and most of a refiners gasoline pool is usually derived directly from the FCC unit. It is important that the unit operate reliably for years, and be able to accommodate a variety of feeds, including very heavy feeds. The unit must operate without exceeding local limits on pollutants or particulates. The catalyst is somewhat expensive, and most units require several hundred tons of catalyst in inventory. Most FCC units circulate tons of catalyst per minute, the large circulation being necessary because the feed rates are large and for every ton of oil cracked roughly 5 tons of catalyst are needed.

These large amounts of catalyst must be removed from cracked products lest the heavy hydrocarbon products be contaminated with catalyst and fines. Even with several stages of cyclone separation some catalyst and catalyst fines invariable remain with the cracked products. These concentrate in the heaviest product fractions, usually in the Syntower (or main FCC fractionator) bottoms, sometimes called the slurry oil because so much catalyst is present. Refiners frequently let this material sit in a tank to allow more of the entrained catalyst to drop out, producing CSO or clarified slurry oil.

The problems are as severe or worse in the regenerator. In addition to the large amounts of catalyst circulation needed to satisfy the demands of the cracking reactor, there is an additional internal catalyst circulation that must be dealt with. In most bubbling bed catalyst regenerators, an amount of catalyst equal to the entire catalyst inventory will pass through the regenerator cyclones every 15 minutes or so. Most units have several hundred tons of catalyst inventory. Any catalyst not recovered using the regenerator cyclones will remain with the regenerator flue gas, unless an electrostatic precipitator, bag house, or some sort of removal stage is added at considerable cost. The amount of fines in most FCC flue gas streams exiting the regenerator is enough to cause severe erosion of turbine blades if a power recovery system is installed to try to recover some of the energy in the regenerator flue gas stream. Generally a set of cyclonic separators (known as a third stage separator) is installed upstream of the turbine to reduce the catalyst loading and protect the turbine blades.

While high efficiency third stage cyclones have increased recovery of conventional FCC catalyst from the flue gas leaving the regenerator they have not always reduced catalyst and fines losses to the extent desired. Some refiners were forced to install electrostatic precipitators or some other particulate removal stage downstream of third stage separators to reduce fines emissions.

Many refiners now use high efficiency third stage cyclones to decrease loss of FCC catalyst fines to acceptable levels and/or protect power recovery turbine blades. However, current and future legislation will probably require another removal stage downstream of the third stage cyclones unless significant improvements in efficiency can be achieved.

We wanted to improve the operation of cyclones, especially their performance on the less than 5 micron particles, which are difficult to remove in conventional cyclones and, to some extent, difficult to remove using electrostatic precipitation.

Based on observations and testing of a transparent, positive pressure cyclone, we realized cyclones had a problem handling this 5 micron and smaller size material. We believed we could improve the performance of those cyclones by drawing underflow in a special way.

Our studies confirmed that FCC cyclones present unique problems, and unique opportunities to improve efficiency. The problems are unique in that FCC cyclones must operate for years, and reliably remove such a spectrum of particulates from flowing gas streams. While catalysts have improved, and do not attrit as much in standardized tests, the FCC environment for catalyst deteriorated. In general, refiners subject the catalyst to more handling, and cause more attrition, by forcing catalyst and vapor to make 4 or 5 turns within a cyclone, rather than 1 or 2. Thus the problem of removing particles in the 5 micron and smaller range has gotten worse, due to increased wear on the catalyst from use of high velocity cyclones to improve efficiency, and from ever stricter limits on particulates in flue gas.

We discovered that the operation of a positive pressure cyclone could be improved by providing a large slot or series of slots on the cyclone wall below the level of the outlet tube for solids underflow. These slots permit circumferential removal of both fines and a limited amount of vapor from the cyclone. This tangential withdrawal may be in addition to, or instead of, the conventional solids withdrawal from the bottom.

In most cyclones, solids are generally withdrawn at right angles to rotational vapor flow within the cyclone, and in the opposite direction to flow of gas from the cyclone outlet.

In our apparatus and process, withdrawing material from an unconventional place (tangential withdrawal) as a supplement to or replacement to conventional underflow produces a cyclone which is unexpectedly effective at removing both large and small particles.

BRIEF SUMMARY OF THE INVENTION

The present invention provides a cyclone separator of a cylindrical cyclone body having a cylindrical axis, a sealed end portion, an open end with means for admission of gas and entrained solids and withdrawal of gas with a reduced solids content, and a gas and concentrated underflow means for removing a concentrated solids stream and a minor portion of gas, said open end portion having a tangential vapor inlet for a vapor stream and entrained solids and a cylindrical vapor outlet tube having an inlet within said cylindrical cyclone body and a cylindrical axis aligned with said cylindrical axis of said cylindrical cyclone body; said sealed end portion located at an opposing end of said cylindrical body from said vapor outlet tube; said underflow means in said cylindrical sidewall of said cyclone body at a location intermediate said end portion and a point on said sidewall normal to said cylindrical vessel and said inlet of said outlet tube.

In another embodiment, the present invention provides in an FCC process wherein a heavy feed is catalytically cracked by contact with a regenerated cracking catalyst in a cracking reactor to produce lighter products and spent catalyst, and wherein spent catalyst is regenerated in a catalyst regenerator containing primary and secondary separators for recovery of catalyst and fine from flue gas to produce a flue gas stream containing entrained catalyst fines, the improvement comprising use of a third stage separator to remove at least a portion of the catalyst fines from the flue gas, said separator comprising at least one horizontal cyclone with a cylindrical cyclone body having a cylindrical axis, a sealed end portion, an open end with means for admission of gas and entrained solids and withdrawal of gas with a reduced solids content, and a gas and concentrated underflow means for removing a concentrated solids stream and a minor portion of gas, said open end portion having a tangential vapor inlet for a vapor stream and entrained solids and a cylindrical vapor outlet tube having an inlet within said cylindrical cyclone body and a cylindrical axis aligned with said cylindrical axis of said cylindrical cyclone body; said sealed end portion located at an opposing end of said cylindrical body from said vapor outlet tube; said underflow means located in said cylindrical sidewall of said cyclone body at a location intermediate said end portion and a point on said sidewall normal to said cylindrical vessel and said inlet of said outlet tube.

DETAILED DESCRIPTION

Figure 1:
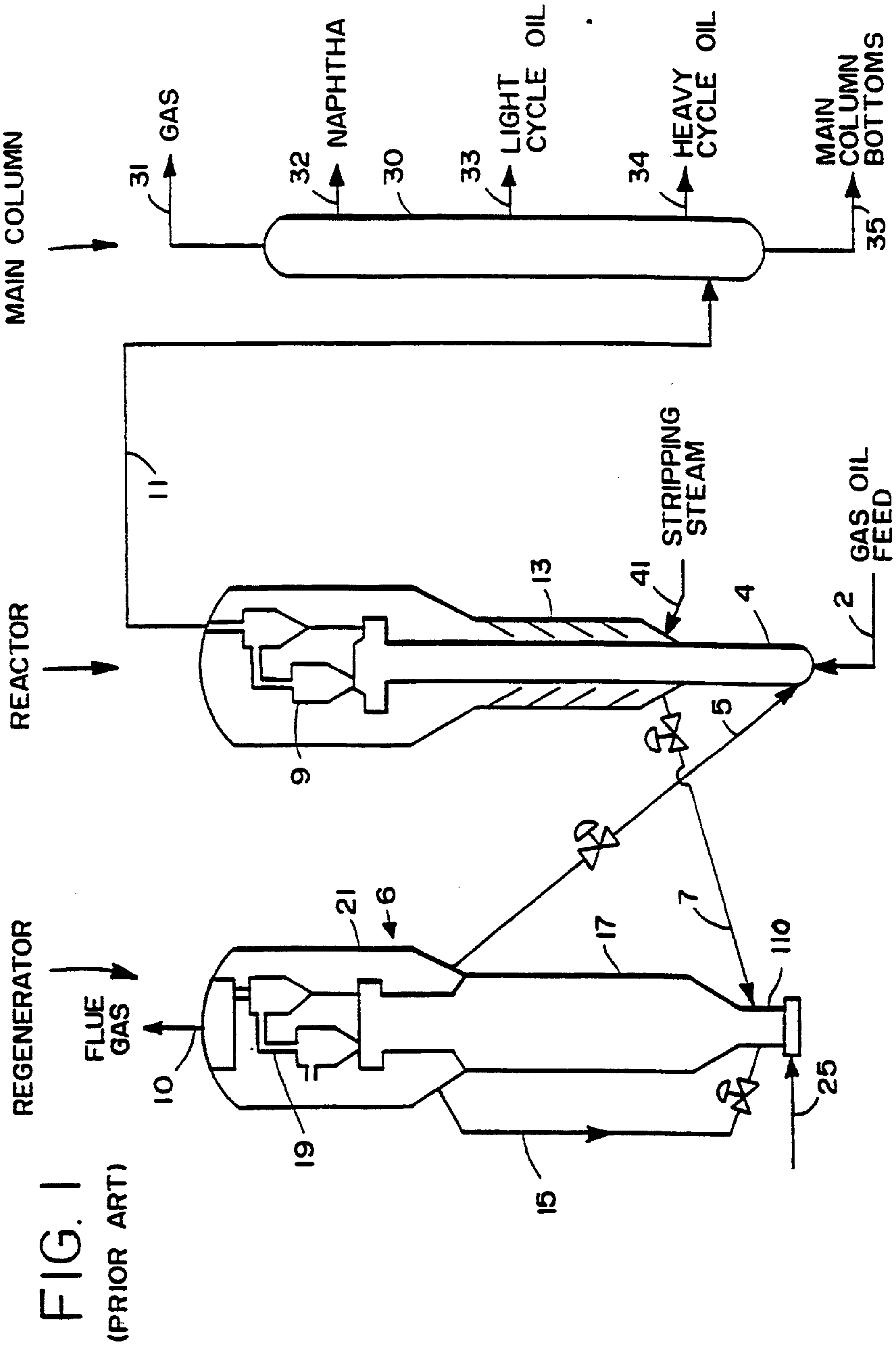
FIG. 1 (PRIOR ART)
FIG. 1 (prior art) is a simplified schematic view of an FCC unit of the prior art.

The present invention can be better understood by reviewing it in conjunction with a conventional riser cracking FCC unit. FIG. 1 illustrates a fluid catalytic cracking system of the prior art. It is a simplified version of FIG. 2 of U.S. Pat. No. 5,039,037, incorporated herein by reference.

FIG. 1 is schematic representation of a side view of a fluid catalytic cracking (FCC) reactor with closed cyclones. Catalyst particles and hydrocarbon feed, which together pass as a commingled mixture through a riser 3, enter a riser cyclone 5 via conduit 17, with the catalyst being separated in the cyclone 5 from a suspension of hydrocarbon vapor/catalyst particles and sent to the bottom of a reactor vessel 1. The hydrocarbons separated in cyclone 5 pass overhead into the reactor 1 vessel space, and from there through a second set of cyclones 7, 9 which further remove catalyst entrained in the gas suspension. Any hydrocarbons exiting overhead from the riser cyclone 5 to the reactor vessel tended to remain in the reactor vessel for too long, thermally cracking the cracked products. Hydrocarbons are removed from the reactor vessel through conduit 11 before they have time to overcrack. Catalyst stripping gas leaves with cracked products. To achieve this, conduit 19 has an opening formed to admit stripper gas. The opening is formed by making the conduit in at least two parts. The first part is a gas extension tube 21 which extends vertically from the overhead of the riser cyclone 5, and the second is an inlet duct 23 for a next-in-line primary cyclone 7. The inlet duct has a larger diameter than the gas extension tube so a first annular port is formed between the two parts, and stripping gas passes through the annular port.

Figure 3B:
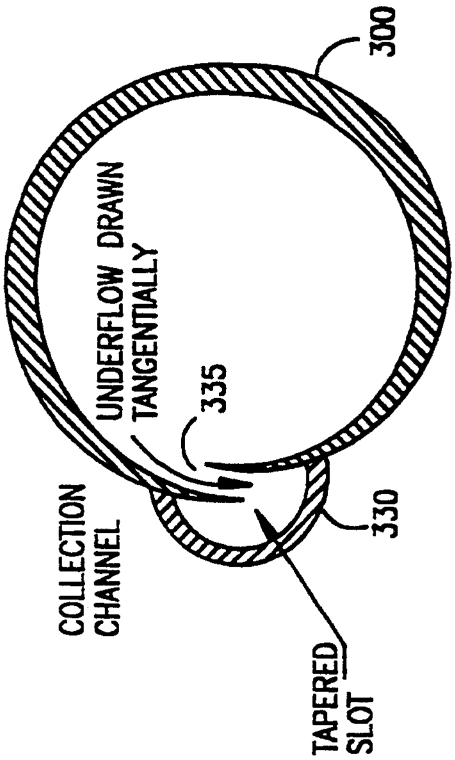
FIG. 3*b* (invention) is a cross sectional view of the cyclone taken along lines BB.
Figure 3A:
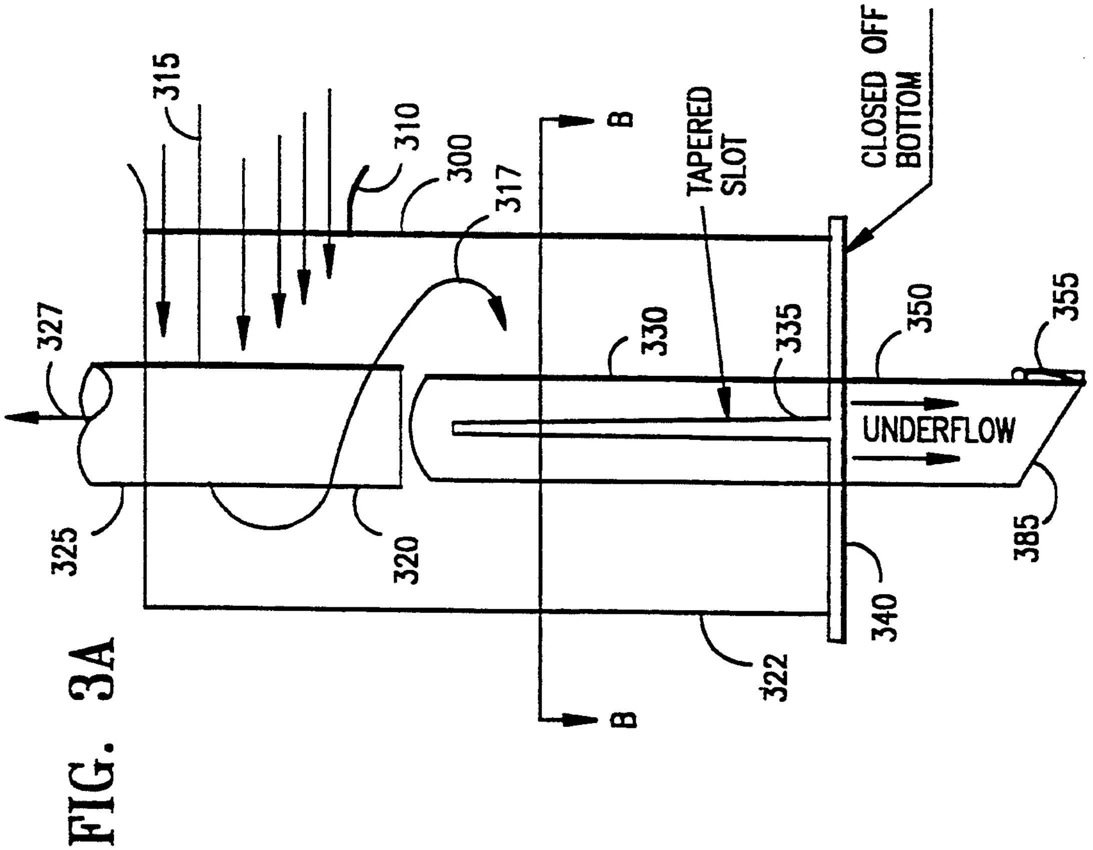
FIG. 3*a* (invention) is a simplified sectional view of a preferred underflow cyclone.

To seal the riser cyclone 5 dipleg 29 the dipleg may be immersed into the bed of catalyst 51 in the stripper as shown, or a seal pot arrangement, such as shown in FIG. 3 of U.S. Pat. No. 5,055,177, or closed with a weighted or spring loaded flapper valve means not shown.

Vessel 1 has a conventional catalyst stripping section 49 in a lower portion of the vessel. Vessel 1 surrounds the upper terminal end of a riser 3 to which are attached a riser cyclone 5, a primary cyclone 7, and secondary cyclone 9. The riser cyclone 5 is attached to the riser 3 by means of a riser conduit 17, which is an enclosed conduit. The riser cyclone 5 in turn is connected to the primary cyclone 7 by means of the riser cyclone overhead conduit 19. The primary cyclone 7 is attached to the secondary cyclone 9 by a conventional enclosed conduit 25. Overhead gas from the secondary cyclone 9, or other secondary cyclones in parallel (not shown), exits the reactor vessel 1 by means of an overhead conduit 11 for cyclone 9, or conduit 13, for a parallel set of cyclones. The gases which exit the reactor through the overhead conduit 11, and the overhead conduit 13, are combined and exit through the reactor overhead port 15. Catalyst particles recovered by the cyclones 5, 7, 9 drop through cyclone diplegs 29, 31, and 33 into the stripper zone 49, which strips hydrocarbons from catalyst. Although only one series connection of cyclones 5, 7, 9 are shown more than one series connection and/or more or less than three stages of cyclones in series could be used.

The riser cyclone overhead conduit 19 provides a way for vapor to directly travel from the riser cyclone 5 to the primary cyclone 7 without entering the reactor vessel 1 atmosphere. Annular port 27 admits stripping gas from the reactor vessel 1 into the conduit 19.

The '177 patent used conventional cyclones, which will be reviewed next.

Figure 2:
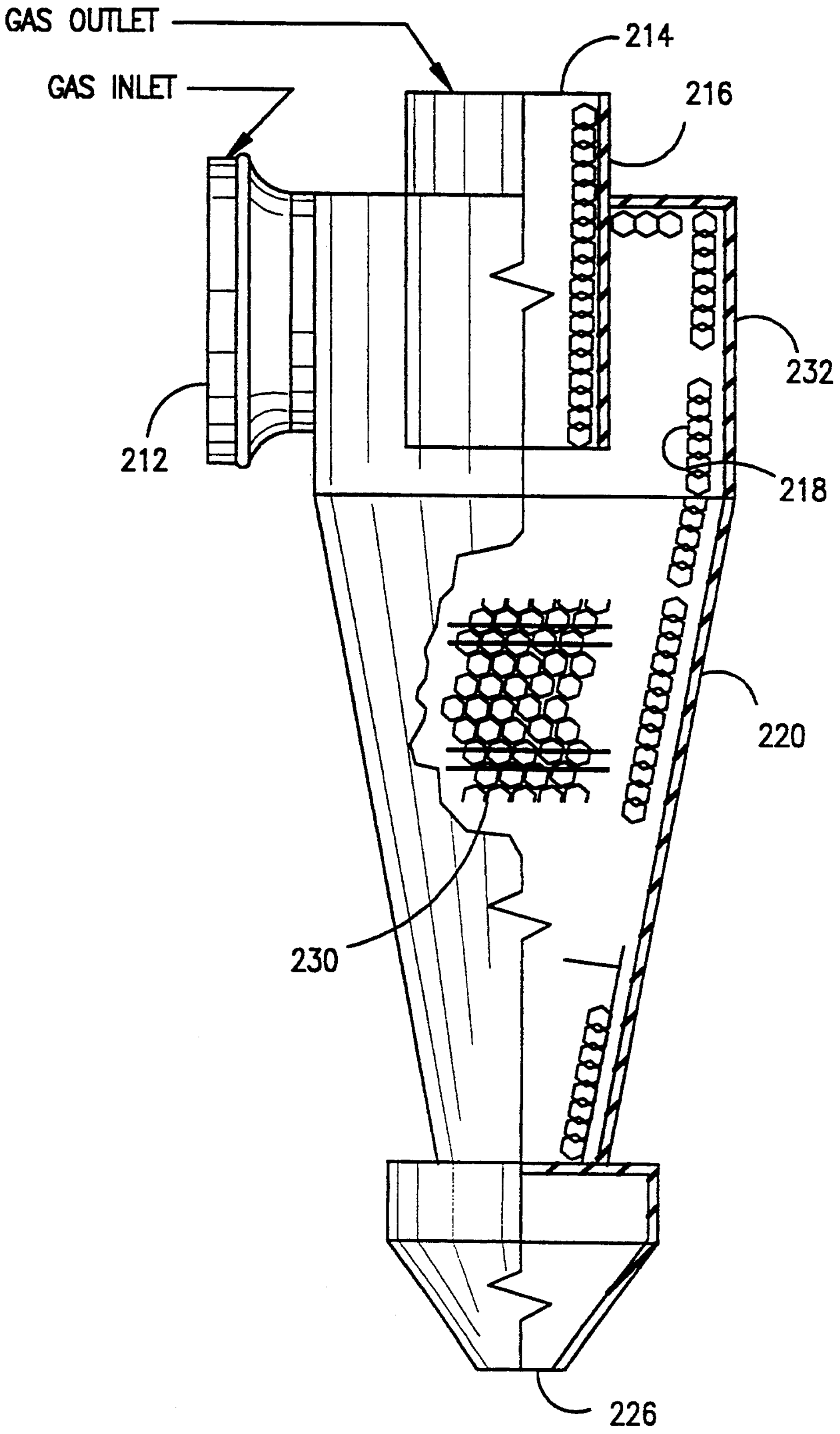
FIG. 2 (PRIOR ART)
FIG. 2 (prior art) is a simplified schematic view of a conventional high efficiency cyclone.

FIG. 2 (prior art) illustrates a conventional vertical cyclone, taken from API Publication 931—Cyclone Separators, 1975. The discussion which follows presumes that the cyclone is being used on the regenerator side of an FCC unit.

Hot vapor and entrained catalyst enter cyclone 210 via gas inlet 212. The incoming gas stream enters the cyclone tangentially, and swirls around outlet tube 216. The catalyst is thrown to the wall 218 while the gas passes through tube 216 and up through gas outlet 214. The wall of the outlet tube and wall 232 of the cyclone are typically lined with an inch or so of refractory concrete in a hexmesh grating when catalyst concentrations are high and erosion may be a problem. Catalyst thrown to the cylindrical sidewalls 232 passes down through tapering section 220, which also may be lined with refractory 230, and is discharged down via fluidized solids outlet 226. The cyclone outlet may be sealed, and sealing is usually accomplished by providing a long dipleg, not shown, either immersed in a fluidized bed, or terminating in a flapper valve.

FIG. 3 (invention) shows a sectional view of a preferred cyclone which can be used as a third stage separator in a third stage separator or as any positive pressure cyclone where a high efficiency is desired.

A mixture of flue gas vapor and entrained catalyst and fines 315 enters the inlet 310 of underflow cyclone separator 300. The mixture is charged tangentially to the cyclone and flows around that portion of the vapor outlet tube 320 which is within the body of the separator. Usually the entering vapor will make 3 to 5 or more turns within the body of separator 300, throwing large and small particles to the cylindrical walls 322.

After gas and particulates spiral around and down within the separator to an elevation beneath the outlet tube 320, particulates and fines are withdrawn, along with some of the gas, via a tapered slot or opening 335 in collection channel 330. The slot or opening preferably provides a way for both catalyst and cracked product vapor to be removed from a majority of the area below the lowermost portion of the outlet tube. Although FIG. 3 shows a vertical orientation, with cracked product vapors 327 withdrawn via that portion of the outlet tube 325 extending out of the cyclone 300, other orientations are possible. The device will work slightly better when gas flow is generally up, and solids flow generally down, or tangential and down as shown in FIG. 3, because gravity then helps the particles settle out of the gas stream.

Spent catalyst solids and some vapor are withdrawn via collection channel and discharged via standpipe 350, which may be of any desired shape either circular, oval, or rectangular, to outlet 385. A conventional, close fitting flapper valve is not preferred. Preferably the outlet is a means or device designed to allow a controlled amount of vapor to be discharged continuously. The device (flapper valve, or slide valve, or other flow control means), permits controlled vapor leakage, on the order of 1 to 20 vol % of the vapor entering the cyclone, and preferably from 2 to 5 vol % of the vapor entering the cyclone to exit with the underflow.

Figure 4B:
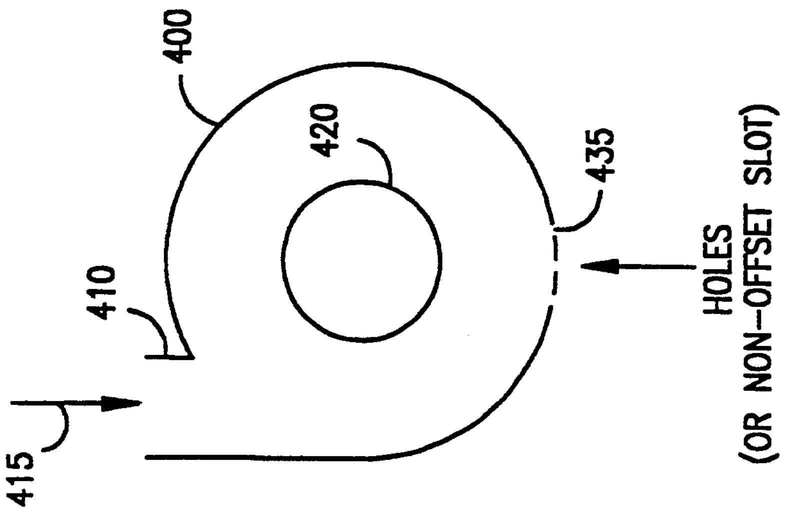
FIGS. 4*a* and 4*b* (invention) are side and end views respectively of a cyclone which is simpler to fabricate.
Figure 4A:
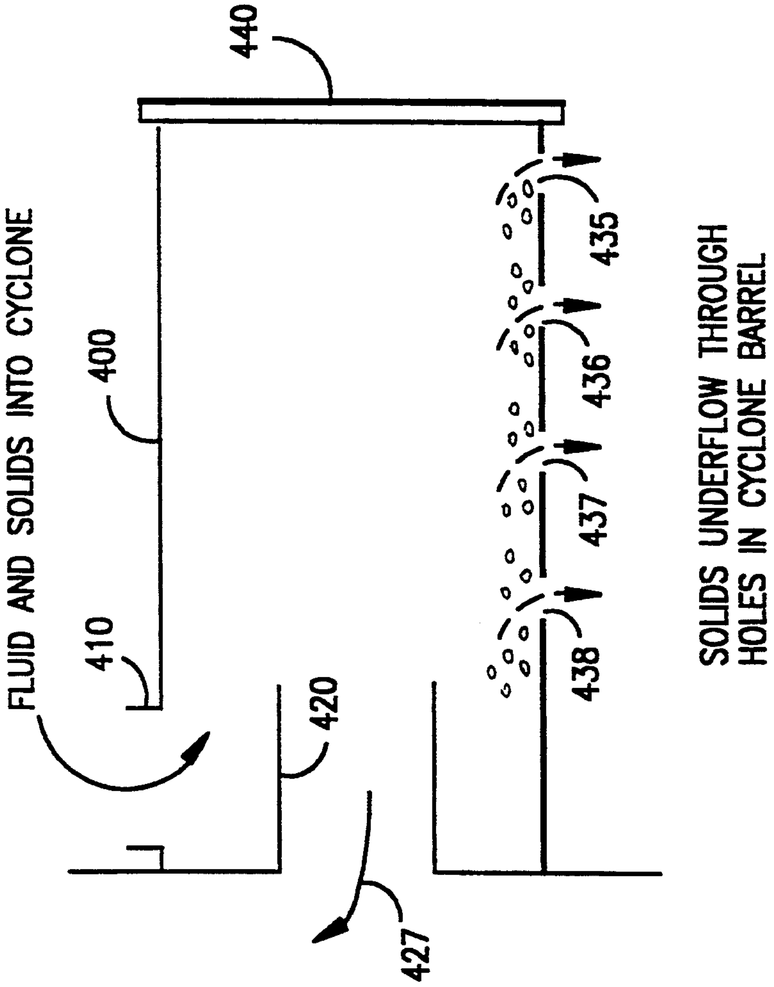

FIG. 4 (invention) shows a side view of a horizontal cyclone embodiment, which is easier to fabricate than the FIG. 3 embodiment. It will be reviewed as if in service as a third stage separator downstream of an FCC regenerator.

A stream 415 of flue gas and particulates enters inlet 410 of horizontal cyclone 400. Gas spirals around outlet tube 420, throwing entrained catalyst and fines to the cylindrical walls of the cyclone. Solids gather on the interior cylindrical walls of the device, and rotate to some extent on the walls, but usually at a much slower radial speed than does the vapor. Solids and vapor flow are discharged through a slot or plurality of holes or slots 435 shown distributed about the bottom portion of the cylindrical walls of cyclone 400. The solids underflow, a mix of concentrated solids in vapor, is withdrawn in the direction of the flow of circulating gas in the device, and tangential to the cylindrical walls of the cyclone. Gas with a greatly reduced solids content is withdrawn via outlet tube 420 and gas stream 427 flows into a plenum area connective with many other horizontal cyclones not shown.

Although, as best seen in the end view of the device, the solids underflow withdrawal points are at the 6 o'clock position if the incoming gas flow is at the 12 o'clock position, they may be distributed about many different locations in the cyclone, though not necessarily with equivalent results. If a sloped spiral inlet means 410 is used to ensure smooth addition of gas, and provided none of the outlet means 435–438 is scoured by any direct incoming gas stream, then evenly spaced outlets at the base of the device are preferred. If local constraints would produce a scouring at an underflow outlet location, then it may be beneficial to move some of the underflow outlets, e.g., 437 nearer end wall 440 or nearer the end to which outlet tube 420 is affixed. Another alternative is to shift some or all the outlets to the 3 o'clock, 4 o'clock or 5 o'clock position, so there will be no direct discharge of incoming gas through any outlet. Thus the underflow outlets should be positioned so a rotating layer of concentrated solids in vapor forms on the interior cylindrical walls of the horizontal cyclone, and some portion per pass of the concentrated solids and gas stream is laterally discharged through the cylindrical walls.

Having provided an overview of the FCC process and the new cyclone design, a more detailed review of the FCC process and of preferred cyclone separators follows.

FCC Feed

Any conventional FCC feed can be used. The process of the present invention is especially useful for processing difficult charge stocks, those with high levels of CCR material, exceeding 2, 3, 5 and even 10 wt % CCR.

The feeds may range from typical petroleum distillates or residual stocks, either virgin or partially refined, to coal oils and shale oils. The feed frequently will contain recycled hydrocarbons, such as light and heavy cycle oils which have already been cracked. Preferred feeds are gas oils, vacuum gas oils, atmospheric resids, and vacuum resids. The invention is most useful with feeds having an initial boiling point above about 650° F.

FCC Catalyst

Any commercially available FCC catalyst may be used. The catalyst can be 100% amorphous, but preferably includes some zeolite in a porous refractory matrix such as silica-alumina, clay, or the like. The zeolite is usually 5–40 wt % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 wt % RE.

Relatively high silica zeolite containing catalysts are preferred for use in the present invention. They withstand the high temperatures usually associated with complete combustion of CO to CO2 within the FCC regenerator.

The catalyst inventory may contain one or more additives, either as separate additive particles, or mixed in with each particle of the cracking catalyst. Additives can enhance octane (shape selective zeolites, typified by ZSM-5, and other materials having a similar crystal structure), absorb SOX (alumina), or remove Ni and V (Mg and Ca oxides).

Additives for removal of SOx are available from catalyst suppliers, e.g., Katalistiks International, Inc.'s "DeSOx." CO combustion additives are available from most FCC catalyst vendors, and their use is preferred. The FCC catalyst composition, per se, forms no part of the present invention.

FCC Reactor Conditions

Conventional riser cracking conditions may be used. Typical riser cracking reaction conditions include catalyst/oil ratios of 0.5:1 to 15:1 and preferably 3:1 to 8:1, and a catalyst contact time of 0.1–50 seconds, and preferably 0.5 to 5 seconds, and most preferably about 0.75 to 4 seconds, and riser top temperatures of 900 to about 1050° F.

It is preferred, but not essential, to use an atomizing feed mixing nozzle in the base of the riser reactor, such as ones available from Bete Fog. More details of use of such a nozzle in FCC processing is disclosed in U.S. Ser. No. 229,670, which is incorporated herein by reference.

It is preferred, but not essential, to have a riser catalyst acceleration zone in the base of the riser.

It is preferred, but not essential, to have the riser reactor discharge into a closed cyclone system for rapid and efficient separation of cracked products from spent catalyst. A preferred closed cyclone system is disclosed in U.S. Pat. No. 5,055,177 to Haddad et al. This may be essential if underflow cyclones of the present invention are to be used a primary cyclones on the reactor riser.

It is preferred, but not essential, to use a hot catalyst stripper. Hot strippers heat spent catalyst by adding some hot, regenerated catalyst to spent catalyst. Suitable hot stripper designs are shown in U.S. Pat. No. 3,821,103, Owen et al, which is incorporated herein by reference.

If hot stripping is used, a catalyst cooler may be used to cool heated catalyst upstream of the catalyst regenerator. A preferred hot stripper and catalyst cooler is shown in U.S. Pat. No. 4,820,404, Owen, incorporated herein by reference.

The FCC reactor and stripper conditions, per se, can be conventional.

Catalyst Regeneration

The process and apparatus of the present invention can use conventional FCC regenerators. Most regenerators are either bubbling dense bed or high efficiency. The regenerator, per se, forms no part of the present invention.

Preferably a high efficiency regenerator, such as is shown in several of the patents incorporated by reference, is used. These have a coke combustor, a dilute phase transport riser and a second dense bed. Preferably, a riser mixer is used. These are widely known and used.

The cyclones are preferably used as a third stage separator removing catalyst and fine from regenerator flue gas.

Cyclone Design

Much of the cyclone design is conventional, such as sizing of the inlet, setting ratios of ID of the outlet tube to other dimensions, etc. Further details, and naming conventions, may be found in Perry's Chemical Engineers' Handbook, 6th Edition, Robert H. Perry and Don Green, which is incorporated by reference. The nomenclature discussion in Gas-Solids Separations, from 20-75 to 20-77, FIG. 20-106, 20-107 and 20-108 is referred to and incorporated by reference.

The slot area, or punched hole area, should be sized large enough to handle anticipated solids flow, and will typically be from 10 to 200% or more of the open area of the conventional reverse flow cyclone solids outlet. The open area, or the slot area, of the tangential outlet located on the wall of the cyclone may range from perhaps 10 or 20% up to about 100% of the conventional solids outlet. Preferably the slot area will be from ¼ to ½ times the area of the bottom of the cyclone.

The slot may be an offset slot in the cyclone wall, or a non-offset slot.

While the tangential outlet can be the sole solids outlet, the device works very well with two outlets, the conventional reverse flow solids outlet and the tangential outlet of the invention.

The horizontal cyclones will be most useful as third stage separators downstream of FCC regenerators. In many installations there will be so little solids loading at this point in the FCC process that refractory lining may not be needed.

Discussion

The new cyclone design is easy to fabricate using conventional techniques. The device significantly improves removal of fine dust, that is, 0–5 micron particle. These particles are removed as soon as they reach the cylindrical sidewall. In contrast, in conventional cyclones these solids must travel the length of the cyclone barrel to the conventional solids outlet, where the solids must exit normal to the gas flow. The new cyclone design will reduce erosion on power recovery turbine blades, and also reduce particulates emissions.

We claim:

1. A cyclone separator comprising a cylindrical cyclone body having a cylindrical axis, a sealed end portion, an open end with means for admission of gas and entrained solids and withdrawal of gas with a reduced solids content, and a gas and concentrated underflow means for removing a concentrated solids stream and a minor portion of gas, said open end portion having a tangential vapor inlet for a vapor stream and entrained solids and a cylindrical vapor outlet tube having an inlet within said cylindrical cyclone body and a cylindrical axis aligned with said cylindrical axis of said cylindrical cyclone body;

said sealed end portion located at an opposing end of said cylindrical body from said vapor outlet tube;

said underflow means located in said cylindrical sidewall of said cyclone body at a location intermediate said end portion and a point on said sidewall normal to said cylindrical vessel and said inlet of said outlet tube and wherein said underflow means comprises at least one member selected from the group consisting of a slot or slit in said sidewall of said tube and a plurality of holes drilled or punched in said sidewall.

2. The cyclone of claim 1 wherein said underflow means comprises a slot or slit in said sidewall of said tube.

3. The cyclone of claim 2 wherein said slot or slit is radially displaced from said cylindrical sidewall for tangential removal of concentrated solids and gas.

4. The cyclone of claim 1 wherein said underflow means comprises a plurality of holes drilled or punched in said cylindrical sidewall.

5. The cyclone of claim 4 wherein said holes are displaced radially at least 90 degrees from said tangential inlet.

6. The cyclone of claim 4 wherein said cylinder is horizontal, gas and particulates are injected down into said cyclone, and said holes are a bottom portion of said horizontal cylinder for removal of concentrated solids and gas in a downward direction.

7. The cyclone of claim 1 wherein there are two solids outlets, a reverse flow cyclone solids outlet having an open area and a tangential outlet located on the sidewall of the cyclone having an open area.

8. The cyclone of claim 7 wherein the open area of the tangential outlet on the sidewall is from 10% to 200% of the open area of the reverse flow cyclone solids outlet.

9. The cyclone of claim 7 wherein the open area of the tangential outlet located on the sidewall is from 20 to 100% of the open area of the reverse flow cyclone solids outlet.

10. The cyclone of claim 7 wherein the open area of the tangential outlet located on the sidewall is from ¼ to ½ of the open area of the reverse flow cyclone solids outlet.

11. In a fluidized catalytic cracking process wherein a heavy feed is catalytically cracked by contact with a regenerated cracking catalyst in a cracking reactor to produce lighter products and spent catalyst, and wherein spent catalyst is regenerated in a catalyst regeneration means containing primary and secondary separators for recovery of catalyst and fines from flue gas to produce a flue gas stream containing entrained catalyst fines, the improvement comprising use of a third stage separator to remove at least a portion of the catalyst fines from the flue gas, said third stage separator comprising at least one horizontal cyclone with a cylindrical cyclone body having a cylindrical axis, a sealed end portion, an open end with means for admission of gas and entrained solids and withdrawal of gas with a reduced solids content, and a gas and concentrated underflow means for removing a concentrated solids stream and a minor portion of gas, said open end portion having a tangential vapor inlet for a vapor stream and entrained solids and a cylindrical vapor outlet tube having an inlet within said cylindrical cyclone body and a cylindrical axis aligned with said cylindrical axis of said cylindrical cyclone body;

said sealed end portion located at an opposing end of said cylindrical body from said vapor outlet tube;

said underflow means located in said cylindrical sidewall of said cyclone body at a location intermediate said end portion and a point on said sidewall normal to said cylindrical vessel and said inlet of said outlet tube and wherein said underflow means comprises at least one member selected from the group consisting of a slot or slit in said sidewall of said tube and a plurality of holes drilled or punched in said sidewall;and said third stage separator operates under a positive pressure.

12. The process of claim 11 wherein said underflow means comprises a slot or slit in said sidewall of said tube.

13. The process of claim 12 wherein said slot or slit is radially displaced from said cylindrical sidewall for tangential removal of concentrated solids and gas.

14. The process of claim 11 wherein said underflow means comprises a plurality of holes drilled or punched in said cylindrical sidewall.

15. The process of claim 14 wherein said holes are displaced radially at least 90° from said tangential inlet.

16. The process of claim 14 wherein said cylinder is horizontal, gas and particulates are injected down into said cyclone, and said holes are a bottom portion of said horizontal cylinder for removal of concentrated solids and gas in a downward direction.

17. The process of claim 11 wherein there are two solids outlets, a reverse flow cyclone solids outlet having an open area and a tangential outlet located on the sidewall of the cyclone having an open area.

18. The process of claim 17 wherein the open area of the tangential outlet on the sidewall is from 10% to 200% of the open area of the reverse flow cyclone solids outlet.

19. The process of claim 17 wherein the open area of the tangential outlet located on the sidewall is from 20 to 100% of the open area of the reverse flow cyclone solids outlet.

* * * * *